(12) United States Patent
Arimilli et al.

(10) Patent No.: US 6,678,814 B2
(45) Date of Patent: Jan. 13, 2004

(54) METHOD AND APPARATUS FOR ALLOCATING DATA USAGES WITHIN AN EMBEDDED DYNAMIC RANDOM ACCESS MEMORY DEVICE

(75) Inventors: Ravi Kumar Arimilli, Austin, TX (US); James Stephen Fields, Jr., Austin, TX (US); Sanjeev Ghai, Round Rock, TX (US); Praveen S. Reddy, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 09/895,225

(22) Filed: Jun. 29, 2001

(65) Prior Publication Data

US 2003/0005215 A1 Jan. 2, 2003

(51) Int. Cl.[7] .............................................. G06F 12/02
(52) U.S. Cl. ..................... 711/173; 711/105; 711/153
(58) Field of Search ................................ 711/105, 170, 711/173, 153

(56) References Cited

U.S. PATENT DOCUMENTS

| | | | |
|---|---|---|---|
| 5,737,750 A | * | 4/1998 | Kumar et al. ............... 711/129 |
| 6,205,519 B1 | * | 3/2001 | Aglietti et al. ............. 711/133 |
| 6,226,738 B1 | * | 5/2001 | Dowling .................... 712/225 |
| 6,324,621 B2 | * | 11/2001 | Singh et al. ................ 711/129 |
| 6,366,994 B1 | * | 4/2002 | Kalyur ....................... 711/173 |

* cited by examiner

*Primary Examiner*—Gary Portka
(74) *Attorney, Agent, or Firm*—Casimer K. Salys; Bracewell & Patterson, L.L.P.

(57) ABSTRACT

An apparatus for allocating data usage in an embedded dynamic random access memory (DRAM) device is disclosed. The apparatus for allocating data usages within an embedded dynamic random access memory (DRAM) device comprises a control analysis circuit, a data/command flow circuit, and a partition management control. The control analysis circuit generates an allocation signal in response to processing performances of a processor. Coupled to an embedded DRAM device, the data/command flow circuit controls data flow from the processor to the embedded DRAM device. The partition management control, coupled to the control analysis circuit, partitions the embedded DRAM device into a first partition and a second partition. The data stored in the first partition are different from the data stored in the second partition according to their respective usage. The allocation percentages of the first and second partitions are dynamically allocated by the allocation signal from the control analysis circuit.

12 Claims, 3 Drawing Sheets

METHOD AND APPARATUS FOR ALLOCATING DATA USAGES WITHIN AN EMBEDDED DYNAMIC RANDOM ACCESS MEMORY DEVICE

RELATED PATENT APPLICATION

This patent application is related to application U.S. Ser. No. 09/895,224 filed on even date, entitled "METHOD AND APPARATUS FOR ACCESSING BANKED EMBEDDED DYNAMIC RANDOM ACCESS MEMORY DEVICES", now U.S. Pat. No. 6,606,680.

BACKGROUND OF THE INVENTION

1. Technical Field

The present invention relates to memory devices in general, and in particular to embedded dynamic random access memory devices. Still more particularly, the present invention relates to a method and apparatus for allocating data usages within an embedded dynamic random access memory device.

2. Description of the Prior Art

Embedded dynamic random access memory (DRAM) is a type of integrated circuit having both memory cells and their control circuits formed on a single semiconductor chip. Specifically, a complete embedded DRAM includes multiple transfer field effect transistors (FETs), a capacitor coupled to each of the transfer FETs, and a group of control circuitry. Each transfer FET acts as a switch between the lower electrode of the capacitor and a bit line. As such, data within the capacitor can be written in or read out from the embedded DRAM.

Embedded DRAMs are capable of transferring a large quantity of data at a very high speed. Because of their relatively high processing speed and storage capacity, embedded DRAMs have been commonly employed in various high-end integrated circuits, such as graphic processors. In addition, embedded DRAMs can provide an embedded processor a faster access to a relatively large capacity of on-chip memory at a lower cost than that currently available using conventional embedded static random access memories (SRAMs) and/or electrically erasable programmable read only memories (EEPROMs).

The present disclosure provides a method for allocating data usages within an embedded DRAM.

SUMMARY OF THE INVENTION

In accordance with a preferred embodiment of the present invention, an apparatus for allocating data usages within an embedded dynamic random access memory (DRAM) device comprises a control analysis circuit, a data/command flow circuit, and a partition management control. The control analysis circuit generates an allocation signal in response to processing performances of a processor. Coupled to an embedded DRAM device, the data/command flow circuit controls data flow from the processor to the embedded DRAM device. The partition management control, coupled to the control analysis circuit, partitions the embedded DRAM device into a first partition and a second partition. The data stored in the first partition are different from the data stored in the second partition according to their respective usage. The allocation percentages of the first and second partitions are dynamically allocated by the allocation signal from the control analysis circuit.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
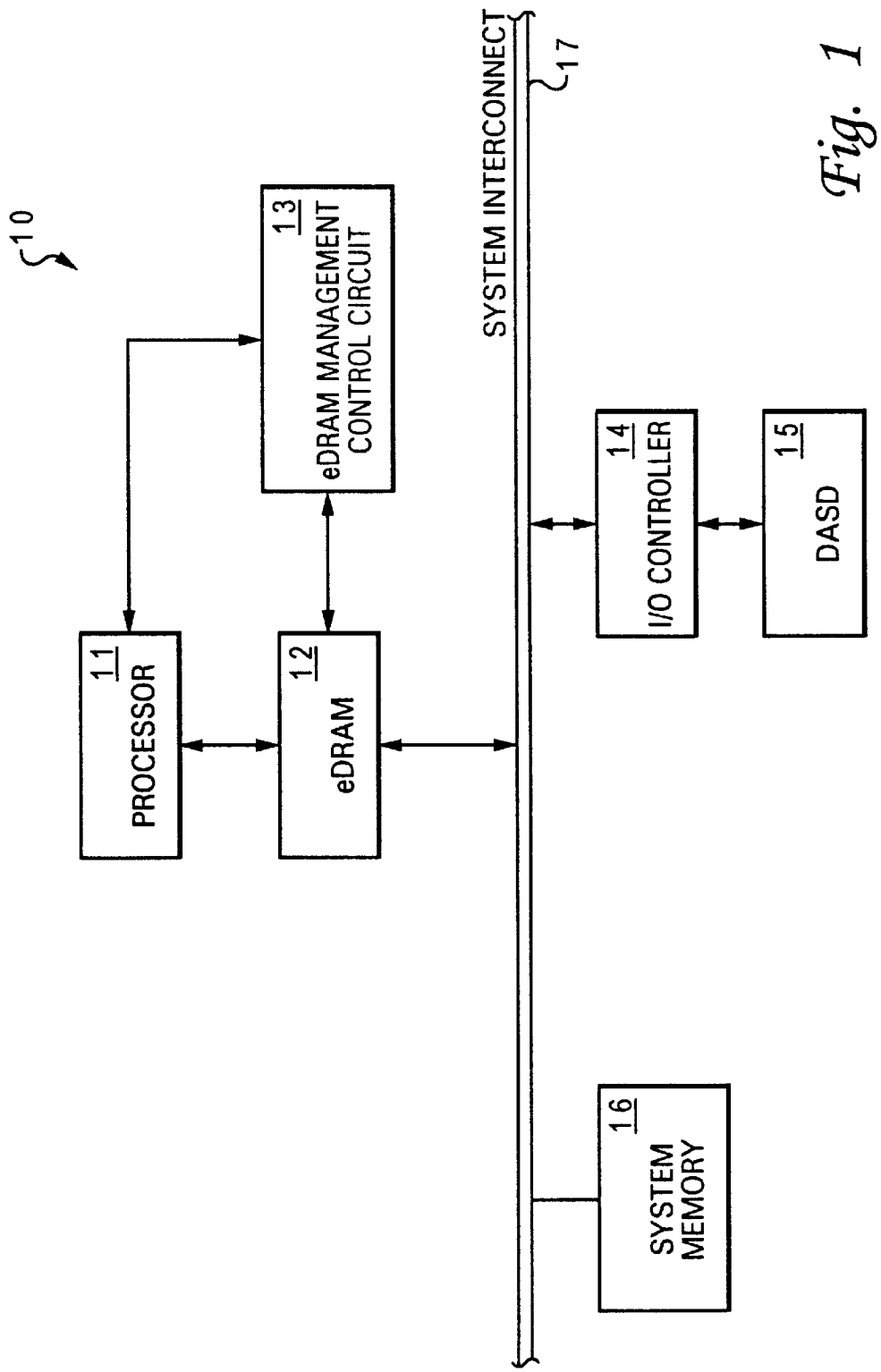
FIG. 1 is a block diagram of a data processing system having an embedded DRAM, in accordance with a preferred embodiment of the present invention.

Referring now to the drawings and in particular to FIG. 1, there is depicted a block diagram of a data processing system having an embedded dynamic random access memory (DRAM), in accordance with a preferred embodiment of the present invention. As shown, a data processing system 10 includes a processor 11 coupled to an embedded DRAM 12, an embedded DRAM management control circuit 13, and a system memory 16. Each of processor 11, embedded DRAM 12, and embedded DRAM management control circuit 13 is preferably an individual integrated circuit device, though some or all of the above-mentioned components can be incorporated within a single integrated circuit device. Processor 11 is coupled to a system interconnect 17 via embedded DRAM 12. A direct access storage disk (DASD) is coupled to system interconnect 17 via an input/output controller 14. Processor 11 preferably includes multiple levels of internal cache memories (not shown). Together with embedded DRAM management control circuit 13, embedded DRAM 12 supplants the need of external cache memories as they are often required in the prior art data processing systems.

Figure 2:
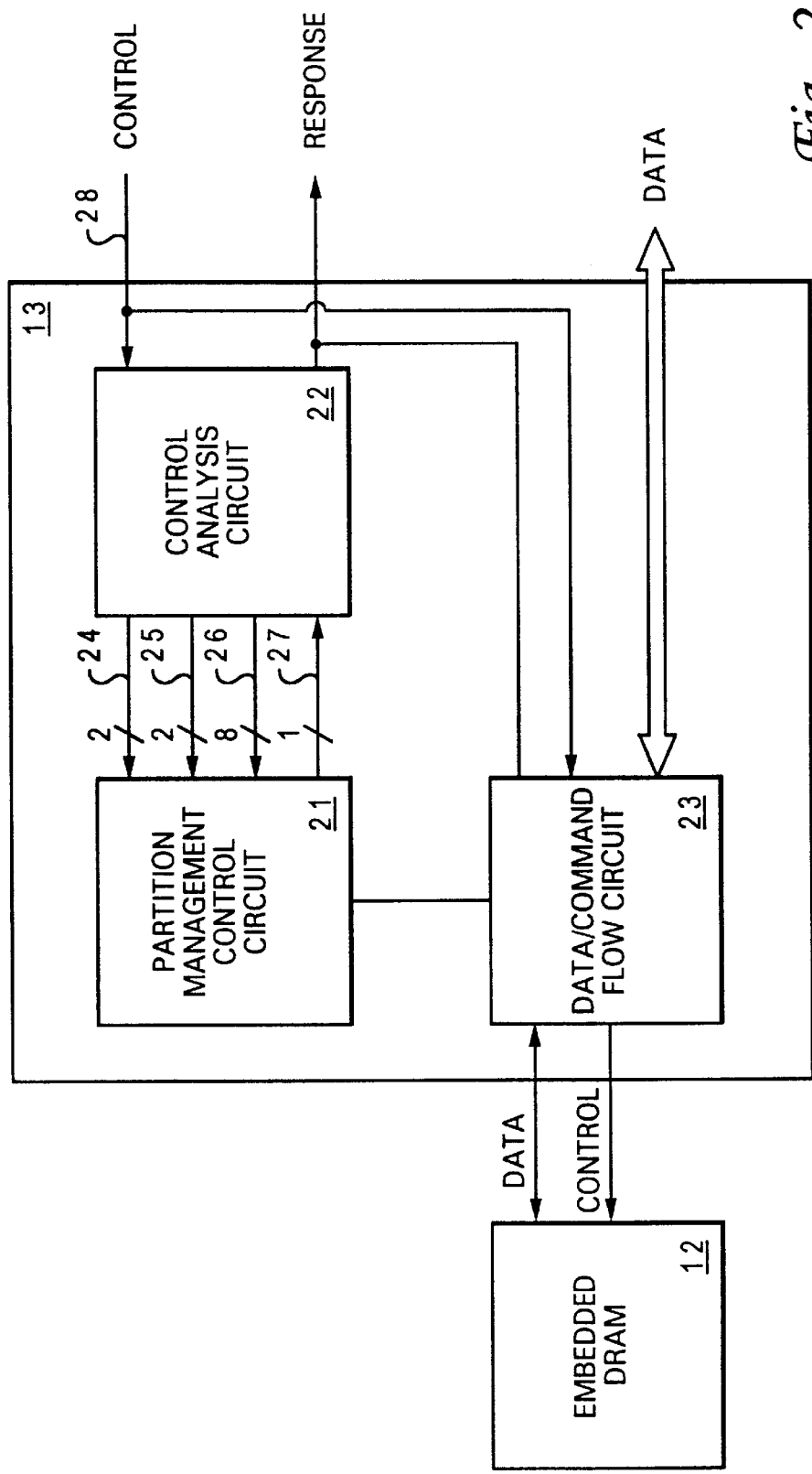
FIG. 2 is a block diagram of an embedded DRAM management control circuit for controlling the embedded DRAM from FIG. 1, in accordance with a preferred embodiment of the present invention.

With reference now to FIG. 2, there is depicted a block diagram of embedded DRAM management control circuit 13 (from FIG. 1) for controlling embedded DRAM 12, in accordance with a preferred embodiment of the present invention. As shown, embedded DRAM management control circuit 13 includes a partition management control (PMC) circuit 21, a control analysis circuit 22, and a data/command flow circuit 23. Although embedded DRAM management control circuit 13 is shown to be external to a processor, it is understood by those skilled in the art that embedded DRAM management control circuit 13 may be incorporated within a processor such as processor 11 from FIG. 1. Control analysis circuit 22 monitors various processing performances of processor 11 (from FIG. 1) via a control line 28. The monitoring function performed by control analysis circuit 22 is similar to a hardware process monitor. By using a group of control buses, control analysis circuit 22 informs PMC circuit 21 when a change in processing needs has been requested by processor 11. Changes in processing needs can be initiated by hardware, software, or a combination of both.

According to the processing needs of processor 11, data stored within embedded DRAM can preferably be divided into two types, namely, Type I data and Type II data. Type I data can be any kind of data that have different resource demands from those of Type II data. For example, Type I data may be data from a cache memory (from a processor) and Type II data may be data from an application, or Type I data may be instructions from a cache memory and Type II data may be data from the same cache memory.

There are many parameters that control analysis circuit 22 can monitor in order to trigger a change in data allocation in embedded DRAM 12. For example, control analysis circuit 22 can monitor a counter that keeps track of all the misses in a cache memory. If the cache misses have reached a predetermined threshold value, control analysis circuit 22 can initiate a change in data allocation in embedded DRAM 12. As another example, control analysis circuit 22 can monitor a loader that keeps track of the number of instructions within a software application. Based of the size of the software application, control analysis circuit 22 can initiate a change in data allocation in embedded DRAM 12 to provide an optimal execution rate for the software application.

The group of control lines from control analysis circuit 22 specifies how PMC circuit 21 configure embedded DRAM 12 for Type I or Type II data. In this implementation, the group of control lines includes a two-bit action request bus 24, a two-bit partition type bus 25, an eight-bit allocation percentage bus 26, and a one-bit complete bus 27. Specifically, action request bus 24 indicates whether an initiated change was sourced from hardware only or from software in the form of an application, or a combination of both. Partition type bus 25 indicates whether all congruence classes within embedded DRAM 12 will have Type I data, all congruence classes within embedded DRAM 12 will have Type II data, some sets of congruence class within embedded DRAM 12 will have Type I data, or some groups of congruence classes within embedded DRAM 12 will have Type I data. Allocation percentage bus 26 indicates what percentage of the sets or congruence classes within embedded DRAM 12 are to be allocated for Type I data. Complete bus 27 indicates when PMC circuit 21 is done restructuring embedded DRAM 12, as defined by the request.

Figure 3:
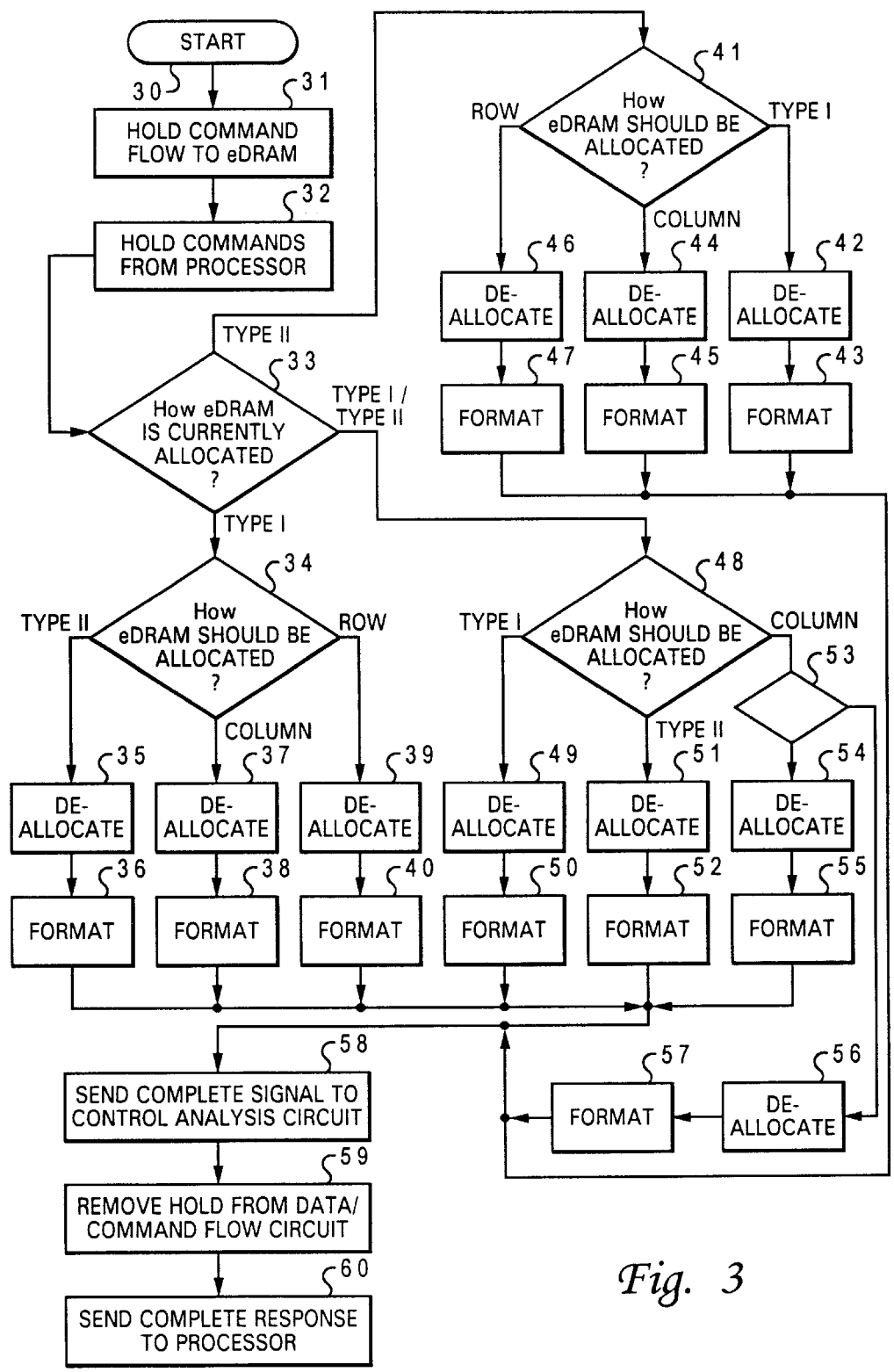
FIG. 3 is a high-level logic flow diagram of a method for allocating the usages of the embedded DRAM from FIG. 1, in accordance with a preferred embodiment of the present invention.

Referring now to FIG. 3, there is depicted a high-level logic flow diagram of a method for allocating data usages of embedded DRAM 12 by embedded DRAM management control circuit 13, in accordance with a preferred embodiment of the present invention. After receiving an allocation request, PMC circuit 21 drives a "hold" signal to data/command flow circuit 23 to quiescent the command flow to embedded DRAM 12, as shown in block 31. The allocation request preferably came from control analysis circuit 22 (from FIG. 2). Then, data/command flow circuit 23 sends a "hold" response to processor 11 to quiescent subsequent commands for a period of time, as depicted in block 32. A determination is then made as to how embedded DRAM 12 is allocated (or subdivided) at this point, as shown in block 33. Such information is provided to PMC circuit 21 by control analysis circuit 22.

If entire embedded DRAM 12 is currently allocated for Type I data usage, then a determination is made as to how embedded DRAM 12 should be allocated based on the allocation request, as depicted in block 34. If the allocation request is to demand all Type I data usage, then no change is required. If the allocation request is to demand all Type II data usage, then commands are sent to embedded DRAM 12 to deallocate Type I data in all congruence classes, and the deallocated data are send to a system memory, as shown in block 35. Commands are then sent to embedded DRAM 12 to format all congruence classes to be of Type II data usage, as depicted in block 36. However, if the allocation request is to demand Type II data usage in some sets of the congruence classes (i.e., columns), then commands are sent to embedded DRAM 12 to deallocate Type I data in the requested sets within all congruence classes, and the deallocated data are sent to the system memory, as shown in block 37. Commands are then sent to embedded DRAM 12 to format the requested sets of the congruence classes to be of Type II data usage, as depicted in block 38. Otherwise, if the allocation request is to demand Type II data usage in some congruence classes (i.e., rows), then commands are sent to embedded DRAM 12 to deallocate Type I data in the requested congruence classes, and the deallocated data are sent to the system memory, as shown in block 39. Commands are then sent to embedded DRAM 12 to format the requested congruence classes to be of Type II data usage, as depicted in block 40.

If entire embedded DRAM 12 is currently allocated for Type II data usage, then a determination is made as to how embedded DRAM 12 should be allocated based on the allocation request, as shown in block 41. If the allocation request is to demand all Type II data usage, then no change is required. If the allocation request is to demand all Type I data usage, then commands are sent to embedded DRAM 12 to deallocate Type II data in all the congruence classes, and the deallocated data are send to the system memory, as depicted in block 42. Commands are then sent to embedded DRAM 12 to format all congruence classes to be of Type I data usage, as shown in block 43. However, if the allocation request is to demand Type I data usage in some sets of the congruence classes, then commands are sent to embedded DRAM 12 to deallocate Type II data in the requested sets within all the congruence classes, and the deallocated data are sent to the system memory, as depicted in block 44. Commands are then sent to embedded DRAM 12 to format the requested sets of the congruence classes to be of Type I data usage, as shown in block 45. Otherwise, if the allocation request is to demand Type I data usage in some congruence classes, then commands are sent to embedded DRAM 12 to deallocate Type II data in the requested congruence classes, and the deallocated data are sent to the system memory, as depicted in block 46. Commands are then sent to embedded DRAM 12 to format the requested congruence classes to be of Type I data usage, as shown in block 47.

If some of embedded DRAM 12 is currently allocated for Type I data usage (while the remaining portions are allocated for Type II data usage), then a determination is made as to how embedded DRAM 12 should be allocated based on the allocation request, as depicted in block 48. If the allocation request is to demand all Type I data usage, then commands are sent to embedded DRAM 12 to deallocate all Type II data, and the deallocated data are sent to the system memory, as shown in block 49. Commands are then sent to embedded DRAM 12 to format all congruence classes to be of Type I data usage, as depicted in block 50. But, if the allocation request is to demand all Type II data usage, then commands are sent to embedded DRAM 12 to deallocate all Type I data, and the deallocated data are sent to the system memory, as shown in block 51. Commands are then sent to embedded DRAM 12 to format all congruence classes to be of Type I data usage, as depicted in block 52. However, if the allocation request is to demand Type II data usage in some sets of congruence classes, then a determination is made as to whether there will be more Type II data usage after this re-allocation, as shown in block 53. If there is, then commands are sent to embedded DRAM 12 to deallocate all necessary Type I data for Type II data usage, and the deallocated data are sent to the system memory, as depicted in block 54. Commands are then sent to embedded DRAM 12 to format the necessary additional space to be for Type II data usage, as shown in block 55. Otherwise if there is not, then commands are sent to embedded DRAM 12 to deallocate all necessary Type II data for Type I data usage, and the deallocated data are sent to the system memory, as depicted in block 56. Commands are then sent to embedded DRAM 12 to format the necessary additional apace to be for Type I data usage, as shown in block 57.

Subsequently, PMC circuit 21 sends a "complete" signal to control analysis circuit 22, as depicted in block 58. The "hold" is then removed from data/command flow circuit 23 by PMC circuit 21, as shown in block 59. Finally, control analysis circuit 22 sends a "complete" response to processor 11, as depicted in block 60.

As has been described, the present invention provides a method and apparatus for allocating data usage in an embedded DRAM device.

While the invention has been particularly shown and described with reference to a preferred embodiment, it will be understood by those skilled in the art that various changes in form and detail may be made therein without departing from the spirit and scope of the invention.

What is claimed is:

1. An apparatus for allocating data usage in an embedded dynamic random access memory (DRAM) device, said apparatus comprising:
   a control analysis circuit for generating an allocation signal in response to processing performances of a processor;
   a data/command flow circuit, coupled to an embedded DRAM device, for controlling data flow from said processor to said embedded DRAM device; and
   a partition management control, coupled to said control analysis circuit, for partitioning said embedded DRAM device into a first partition and a second partition, wherein data stored in said first partition are different from data stored in said second partition according to their respective usage, wherein allocation percentages of said first and second partitions are dynamically allocated by said allocation signal from said control analysis circuit.

2. The apparatus of claim 1, wherein said control analysis circuit sends an allocation request to said partition management control via a request bus.

3. The apparatus of claim 2, wherein said control analysis circuit informs said partition management control the type of each of said partitions via a partition type bus.

4. The apparatus of claim 2, wherein said control analysis circuit informs said partition management control the percentage of each of said partitions via an allocation percentage bus.

5. A data processing system comprising:
   a processor;
   an embedded dynamic random access memory (DRAM) device coupled to said processor; and
   means for allocating data usage in said embedded DRAM device, wherein said data usage allocating means includes
      a control analysis circuit for generating an allocation signal in response to processing performances of said processor;
      a data/command flow circuit, coupled to an embedded DRAM device, for controlling data flow from said processor to said embedded DRAM device; and
      a partition management control, coupled to said control analysis circuit, for partitioning said embedded DRAM device into a first partition and a second partition, wherein data stored in said first partition are different from data stored in said second partition according to their respective usage, wherein allocation percentages of said first and second partitions are dynamically allocated by said allocation signal from said control analysis circuit.

6. The data processing system of claim 5, wherein said control analysis circuit sends an allocation request to said partition management control via a request bus.

7. The data processing system of claim 6, wherein said control analysis circuit informs said partition management control the type of each of said partitions via a partition type bus.

8. The data processing system of claim 6, wherein said control analysis circuit informs said partition management control the percentage of each of said partitions via an allocation percentage bus.

9. A method for allocating data usage in an embedded dynamic random access memory (DRAM) device, said method comprising:
   generating an allocation signal using a control analysis circuit in response to processing performances of a processor;
   controlling data flow from a processor to said embedded DRAM device using a data/command flow circuit; and
   partitioning said embedded DRAM device into a first partition and a second partition, wherein data stored in said first partition are different from data stored in said second partition according to their respective usage, wherein allocation percentages of said first and second partitions are dynamically allocated by said allocation signal from said control analysis circuit.

10. The method of claim 9, wherein said partitioning is performed via a partition management control.

11. The method of claim 10, wherein said method further include a step informing said partition management control the type of each of said partitions via a partition type bus.

12. The method of claim 10, wherein said method further include a step informing said partition management control the percentage of each of said partitions via an allocation percentage bus.

* * * * *